F. P. MILLER.
BED ATTACHMENT.
APPLICATION FILED NOV. 22, 1911.
1,087,806.
Patented Feb. 17, 1914.
2 SHEETS—SHEET 1.
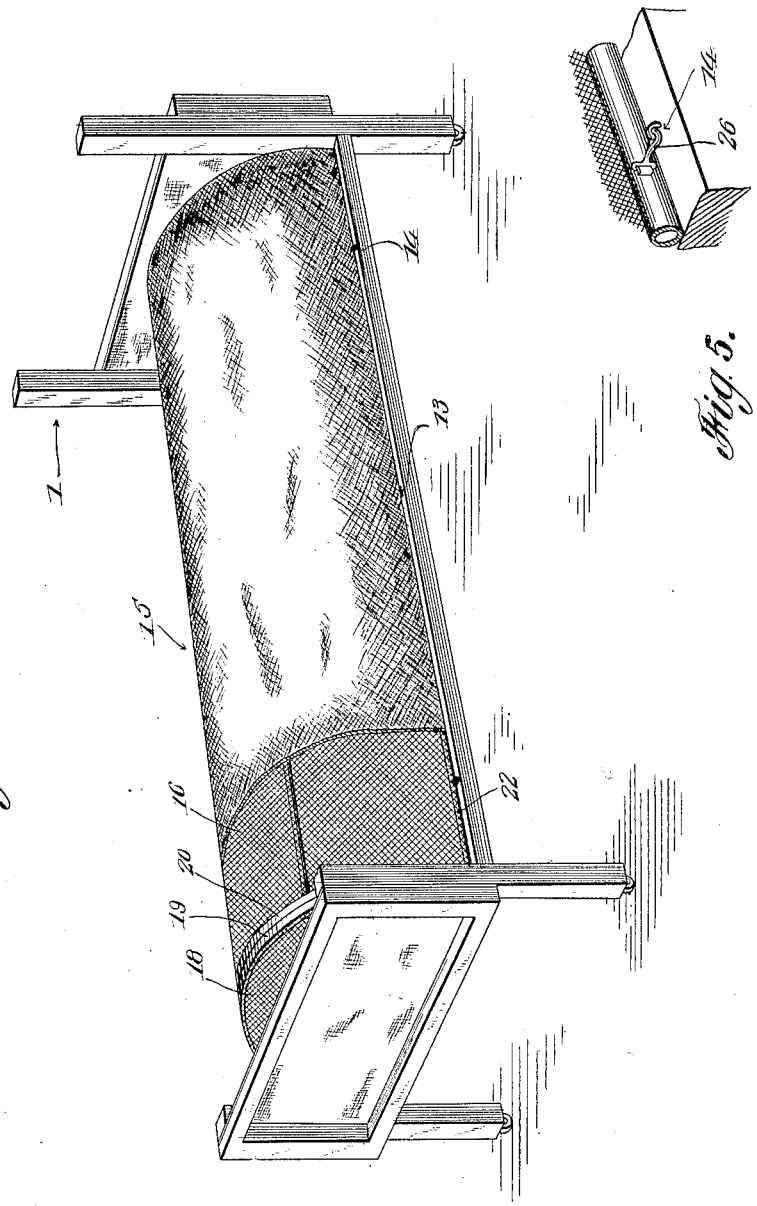
Inventor
Frank P. Miller,
By Victor J. Evans
Attorney
Witnesses F. P. MILLER.
BED ATTACHMENT.
APPLICATION FILED NOV. 22, 1911.
1,087,806.
Patented Feb. 17, 1914.
2 SHEETS—SHEET 2.
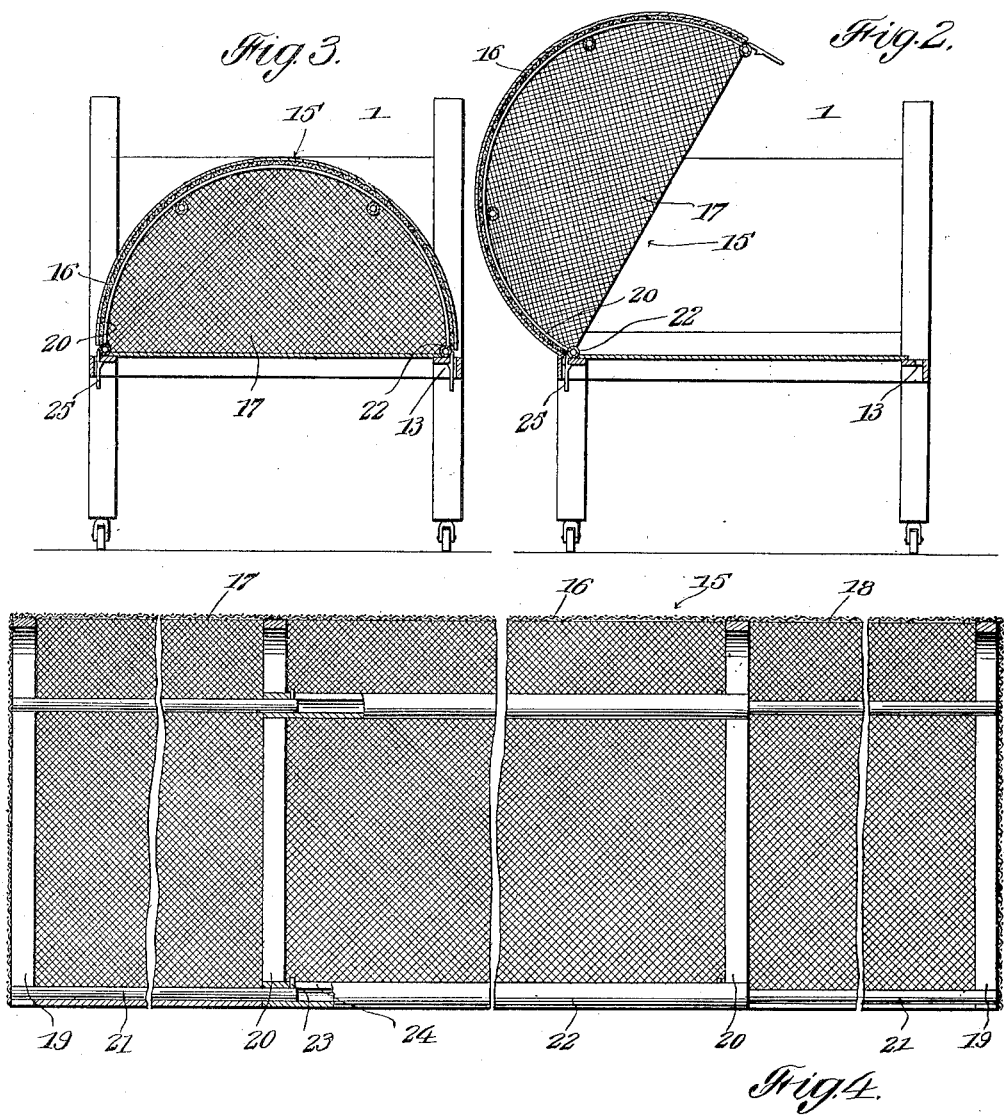

UNITED STATES PATENT OFFICE.

FRANK P. MILLER, OF WASHTUCNA, WASHINGTON.

BED ATTACHMENT.

1,087,806.　　　　　Specification of Letters Patent.　　Patented Feb. 17, 1914.

Application filed November 22, 1911. Serial No. 661,718.

*To all whom it may concern:*

Be it known that I, FRANK P. MILLER, a citizen of the United States, residing at Washtucna, in the county of Adams and State of Washington, have invented new and useful Improvements in Bed Attachments, of which the following is a specification.

The present invention relates to certain novel improvements in beds.

In carrying out my invention it is my purpose to provide a bed which is formed with hinged ends adapted to serve as receptacles for the bed or other clothing, and which is also adapted to receive a suitable frame having a covering of netting as well as an auxiliary covering of suitable rain proof material whereby a person may sleep out of doors irrespective of the weather conditions and without danger of being annoyed by insects or the like.

With the above recited objects in view, the invention resides in the construction, combination and arrangement of parts set forth in and falling within the scope of the appended claim.

The accompanying drawings illustrate a satisfactory reduction of the invention to practice, but the important instrumentalities thereof may be varied, and so it is to be understood that the invention is not limited to the specific arrangement and organization shown and described.

In the drawings, Figure 1 is a perspective view of a bed constructed in accordance with the present invention, and showing the improved canopy or protector in position thereon. Fig. 2 is a transverse sectional view showing the manner of lifting one edge of the protector in order to permit of the entrance of the occupant to the bed. Fig. 3 is a similar sectional view illustrating the canopy or protector locked upon the bed. Fig. 4 is a detail view of the canopy or protector removed, the same illustrating in section the manner in which the ends of the said member may be telescoped to reduce the size of the member. Fig. 5 is a detailed sectional perspective view illustrating the manner of securing the canopy from the interior of the bed.

Referring now to the drawings in detail, the numeral 1, designates a bedstead, the longitudinal or side bars of which are centrally formed with suitable depressions or openings which are arranged in pairs, and which are designated by the numeral 13, while one of the said bars is further provided with suitable rings or swivels 14. The purposes of the elements 13 and 14 will presently be set forth.

The numeral 15 designates the canopy or protector. This member 15 preferably comprises a central section 16, and end sections 17 and 18. The member 15 is approximately semi-cylindrical in cross section and is sustained in its proper position through the medium of end loops or supports 19, as well as intermediate loops or supports 20. The sections 17 and 18, are further provided with longitudinally extending supports 21, and the central section 16 is likewise provided with longitudinal supports 22. The supports 22 of the intermediate section 16 are hollow and are adapted to receive therein the said longitudinal supports of the sections 17 and 18. The lower longitudinal supports of the members 17 and 18, may be, and preferably are provided with suitable off-sets or catches 23, adapted to engage within longitudinal slots 24 formed within the end supports 22 of the intermediate section 16. The canopy 15 is provided with a meshing, which while constructed in sections to correspond with the sections of the said canopy, have their ends connected together so as to render the interior of the said canopy insect proof. The ends of the sections 17 and 18 are likewise provided with similar fabrics, and both ends as well as the body of the said canopy or protector are provided with an outer casing of water proof material, such as canvas or the like. The intermediate section 16 is centrally provided with spring clamps or catches 25, the same adapted to pass through the opening 14 provided in the side members of the bedstead, and the intermediate loop members 20 have their ends provided with suitable rings or snaps 26, the same adapted to engage with the rings or snaps 14 of the bed. By this arrangement it will be noted that when the elements 25 engage within the openings 13, the canopy or protector may be raised to the position illustrated in Fig. 2, so that sufficient space is left between the canopy and the bed to permit of the entrance of the occupant to the bed.

The numerals 6 and 7 designate head and foot sections of the bed which may be employed if desired for retaining the canvas or water-proof covering for the canopy and the bed, when the said covering is not to be employed, as for instance upon warm nights, it will be apparent that when the said covering is to be used the same is placed over the canopy before the said canopy is positioned upon the bedstead. It will be further noted that when the member 15 is spread out the same can, if desired have its ends raised upon the lower extensions 6 and 7 of the bedstead.

From the above description, taken in connection with the accompanying drawings, the simplicity of the device, the cheapness thereof, as well as its advantages will, it is thought be apparent to those to whom such inventions appeal.

Having thus described the invention what I claim is:—

A canopy for bedsteads embodying a frame made up of a plurality of looped members and longitudinally extending members, said frame comprising a central section and telescopic end sections, the lower end connecting members being provided with hinged spring catches which are adapted to engage within openings in the side rails of the bed substantially as and for the purpose set forth.

In testimony whereof I affix my signature in presence of two witnesses.

FRANK P. MILLER.

Witnesses:
J. A. McKissick,
W. L. Lightner, Jr.

Copies of this patent may be obtained for five cents each, by addressing the "Commissioner of Patents, Washington, D. C."